Figure 1:
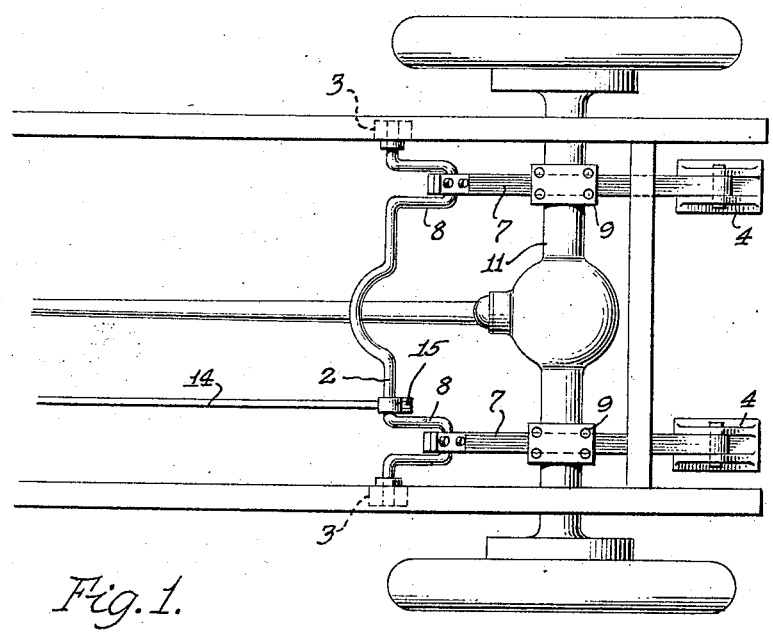

March 5, 1929.  M. KICILESKI  1,704,480

VEHICLE BRAKE MECHANISM

Filed Jan. 25, 1928

Inventor
Mike Kicileski,
By
Attorneys

Patented Mar. 5, 1929.

1,704,480

UNITED STATES PATENT OFFICE.

MIKE KICILESKI, OF DETROIT, MICHIGAN.

VEHICLE BRAKE MECHANISM.

Application filed January 25, 1928. Serial No. 249,280.

This invention relates to a braking system for vehicles having its field of operation outside the vehicle of which the braking system forms a part. I aim to provide a braking device that will engage with the surface over which the vehicle travels and by the friction created between the brake and the ground to enable the vehicle to resist a tendency it may have to slide laterally to its course of travel when traveling over surfaces that are slippery or permit of slipping of the driving wheels of the vehicle. The brake thus applied will prevent what is commonly known as skidding and will enable the operator of the vehicle to have more and better control over his vehicle.

It may also be employed when, in ascending steep grades, it is necessary to stop the vehicle and will thereby secure safe and certain protection against slipping back.

Figure 2:
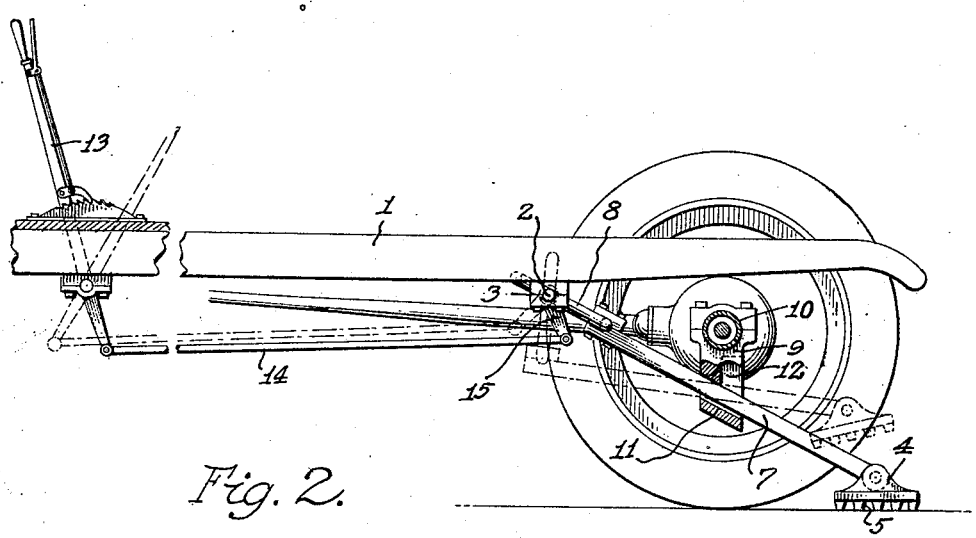

In the drawing,

Figure 1 is a plan view of a motor vehicle frame illustrating my improved braking device, and Fig. 2 is a longitudinal sectional view of the motor vehicle frame embodying my invention.

Referring now more particularly to the accompanying drawing, the brake is mounted and supported on a vehicle frame 1 by means of a crank shaft 2 rigidly engaging the vehicle frame and brackets 3, 3. The brake is composed of a foot 4, 4, of suitable structure to withstand sudden and forcible contact with the ground while the vehicle is moving at any speed and its under surface is provided with teeth 5 or otherwise constructed to create a high degree of resistance when engaging the ground.

A brake foot 4, 4, is pivotally connected to a bar 7, and the bar is pivotally connected to a crank 8, of the crank shaft. The bar 7, may be supported and guided by a bracket 9, 9, mounted on the rear axle housing 10, and the bracket 9, 9, may be provided with a channel 11, 11, inclined downwardly towards the rear of the vehicle to loosely engage the bar and a portion of the upper wall of the channel is cut away as shown at 12, so that when the braking member is out of action the bar may rest in horizontal position. The brake may be operated by a brake lever 13, as shown and is connected to the crank shaft by a rod 14, and arm 15.

What I claim is:

In combination with a motor vehicle, a braking member comprising a foot, and having its lower surface toothed for frictional engagement with the ground, a crank shaft mounted on the vehicle frame having a crank, a bar to which the foot is connected and which is connected to the crank of the crank shaft, a bracket mounted on the rear axle housing and having an opening through which a bar is free to slide longitudinally and rock therein, and a brake lever with a rod pivotally connected thereto and an arm pivotally connected to the rod and rigidly connected to the crank shaft.

In testimony whereof I affix my signature.

MIKE KICILESKI.